Dec. 11, 1962
P. J. HOLMES
3,067,615
CONDITION RESPONSIVE APPARATUS
Filed Aug. 10, 1959
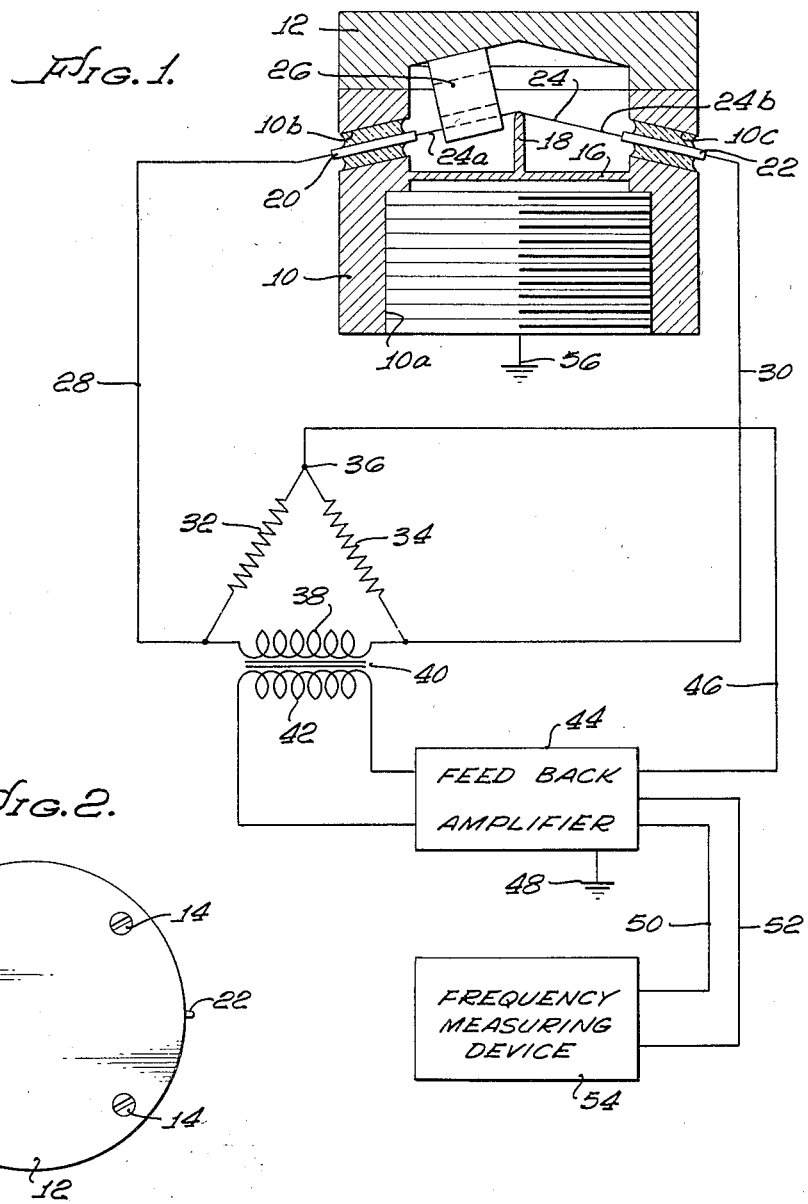
INVENTOR.
PAUL J. HOLMES
BY
ATTORNEY.

United States Patent Office 3,067,615
Patented Dec. 11, 1962

3,067,615
CONDITION RESPONSIVE APPARATUS
Paul J. Holmes, Laguna Beach, Calif., assignor to Borg-Warner Corporation, Chicago, Ill., a corporation of Illinois
Filed Aug. 10, 1959, Ser. No. 832,829
7 Claims. (Cl. 73—398)

The present invention relates to condition responsive apparatus, and more particularly to such apparatus wherein vibratable elements are employed for sensing variations in a given condition.

As has been well known for sometime prior to the instant invention, an elastic string or wire subjected to a specific stress can be made to vibrate freely at only one frequency, namely, that frequency corresponding to the type and degree of stress applied thereto. This frequency is commonly known in the art as the natural mechanical frequency of vibration, and will vary with changes in the stress applied to the string. To utilize this principle for the sensing or measuring of changes in a predetermined condition, it is common practice to connect such a vibratable string to a condition sensing element, the latter of which is caused to move or deflect in response to changes in the condition being sensed.

Typical of such condition sensing elements is a pressure responsive diaphragm which, in the course of time, has been improved to the point where it is possible to provide diaphragms which respond substantially linearly with changes in pressure or force applied thereto. In view of this, such condition sensing elements have found considerable use in devices which employ vibrating elements or strings. Virtually without exception, in such devices the string has been so positioned with respect to the movable portion of the diaphragm that the direction of movement of the latter, in responding to changes in pressure, has been directly in line with the string's axis along which it has been provided with an initial tension. Thus, as the diaphragm responds to a change in condition, a maximum change in the tension of the string and hence a maximum change in the frequency of vibration was effected.

However, it was discovered that in spite of the linear response of the diaphragm to changes in force thereon, such linearity did not prevail between such changes in force and the changes in frequency of vibration of the string. In view of this, it became necessary to calibrate each such condition measuring device so that frequency changes could be translated into changes in force acting on the diaphragm.

In view of the foregoing, it is an object of the present invention to provide a condition sensing device employing a vibratable element wherein changes in frequency of vibration of the element are linearly related to changes in the condition being sensed.

Another object is to provide a condition sensing or measuring device as characterized above, wherein the frequency of vibration of the vibratable element not only varies linearly with condition changes, but also changes directly therewith, whereby specific values of frequency of vibration of such element can be made to correspond to specific values of the condition being sensed.

Another object is to provide a condition sensing device as characterized above, wherein the vibratable element is so positioned with respect to the line of movement of the condition responsive means that the nonlinearity between tension change and frequency change of the element is compensated for by a nonlinear relationship between movement of such condition responsive means and the change in tension of the vibratable element.

Another object of the present invention is to provide a condition sensing device as characterized above, wherein the vibratable element or string is disposed at an angle with respect to the direction of movement of the condition responsive element.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawings, in which:

FIGURE 1 is a combined sectional view of a device embodying the present invention and a schematic diagram showing certain electronic devices in circuit therewith, and FIGURE 2 is a top view of the novel device shown in FIGURE 1.

Like reference characters indicate corresponding parts throughout the several views of the drawings.

Referring to the drawings, and more particularly to FIGURE 1, the embodiment chosen for illustration of the present invention comprises a frame or body 10 to which is fastened an end member 12 by means of screws 14, the latter of which are shown in FIGURE 2. Body 10 is formed with a threaded opening 10a to facilitate fastening of the novel device to a source (not shown) of variations in a given condition to be measured.

Formed out of the stock of body 10 is a condition responsive element or pressure diaphragm 16 provided with a substantially centrally disposed extension 18. As will be appreciated by those persons skilled in the art, diaphragm 16, within the purview of the present invention, may be formed of material separate and apart from body 10 and subsequently affixed thereto by any well known means. However, I prefer to form diaphragm 16 out of the stock of body 10 to minimize the likelihood of creating additional stresses and strains in the diaphragm by fastening it to body 10.

Positioned within suitably formed openings 10b and 10c of body 10 are mounting-terminal pins 20 and 22, there being glass insulating-sealing means interposed between such pins and body 10 to insulatedly and hermetically position such pins with respect to said body.

In the embodiment chosen for illustration of the present invention, a nonmagnetic electrically conductive vibratable element, string or wire 24, having its opposite ends connected to terminal-mounting pins 20 and 22, is suspended within body 10 over extension 18 of diaphragm 16. However, as will become more apparent as the mode of operation of the novel device is explained, element 24 need not have any specific geometrical configuration for successful practice of the instant invention, but rather it may take any desired form or shape, provided it is capable of vibrating at various frequencies according to the amount of stress developed therein. Also, although the embodiment shown and described herein employs an element 24 which is electrically conductive and nonmagnetic, in accordance with prior art teachings such element may be formed of material of high magnetic permeability and low electrical conductivity as will be hereinafter explained in greater detail.

Referring to the details of construction of the device of FIGURE 1, the placement of pins 20 and 22 with respect to diaphragm 16, and the length of extension 18 should be such as to dispose each side 24a and 24b of wire 24 at approximately 6° with respect to the plane of the diaphragm 16. Although it has been found that the advantages of the present invention may be obtained by disposing the vibratable portion 24a of wire 24 at virtually any angle with respect to the direction of movement of diaphragm 16, I have found that optimum results are obtained when the direction of stress change of the vibratable element is disposed at approximately 6° with respect to the plane of the diaphragm 16 or, in other words, at approximately 84° with respect to the direction of movement of the rectilinearly movable condition responsive means.

Fastened to and within the end member 12 or body 10 such as to straddle the vibratable portion 24a of wire 24 when end member 12 is fastened to body 10, is a substantially U-shaped or C-shaped permanent magnet 26. When so assembled, magnet 26 provides opposed magnet pole faces on opposite sides of portion 24a of wire 24. In this manner, there is provided a flow of magnetic flux transversely with respect to the length of the vibratable element 24a.

In circuit with wire 24, as by means of lead wires 28 and 30 connected to terminal-mounting pins 20 and 22 respectively, is a portion of an electrical bridge network comprising resistance elements 32 and 34. Resistance elements 32 and 34 are connected to each other, as at 36, and to the opposite ends of a primary winding 38 of an output transformer 40. Transformer 40 further comprises a secondary winding 42 which is connected to the input terminals of a feedback amplifier shown schematically in the drawing at 44. Such amplifier comprises a feedback circuit 46 which is connected to the input 36 of the electrical bridge network. Amplifier 44 is grounded as shown at 48, and its output terminals are connected, by means of lead wires 50 and 52, to a frequency indicating device 54 such as a frequency meter, frequency counter or the like.

Body 10 of the condition sensing device is grounded as at 56 whereby, in view of the aforedescribed connection of terminal-mounting pins 20 and 22 in circuit with resistance elements 32 and 34, the portions 24a and 24b of wire 24 are caused to constitute elements of the aforementioned resistance bridge network. That is, if resistance elements 32 and 34 are considered to be the elements in the upper half of the resistance bridge, then portions 24a and 24b of wire 24 constitute the lower elements therein by virtue of their connection with said resistance elements and the ground point 56 which effectively places the central point of wire 24 at ground potential. It will be noted that such construction makes a separate bridge network element out of each of the portions 24a and 24b of wire 24, the portion 24a being an active element and the portion 24b being a static element as will hereinafter become more apparent.

The mode of operation of the apparatus shown in FIGURE 1 is generally as follows:

Under steady state conditions, wire 24a vibrates in a direction transverse with respect to the flux flow afforded by permanent magnet 26, the frequency of such vibration corresponding to the stress or tension of said wire. Since wire 24a is electrically conductive, such vibration generates an electromotive force therein. The bridge network is so constructed as to be balanced when the wire 24a is not vibrating. Because of this, an appreciable output is developed in primary winding 38 of transformer 40 whenever wire 24a is vibrating at its resonant or natural mechanical frequency. Such output in primary winding 38 develops a corresponding signal in secondary winding 42 of transformer 40, which signal is fed to feedback amplifier 44. Thereupon, amplifier 44 effects suitable amplification of such signal and returns a portion thereof to the input of the resistance bridge network. Such feedback current flows through the bridge network, including wire 24a, thereby sustaining string 24a in vibration at its resonant frequency. This latter effect is obtained by virtue of the fact that the feedback current is of a positive characteristic with respect to the aforementioned current developed in string 24a as a result of its vibration in the field provided by permanent magnet 26. The sustaining force for the vibration of wire 24a results from the interaction of the magnetic flux afforded by permanent magnet 26 and the magnetic flux afforded by the flow of positive feedback current through said wire 24a.

A major portion of the output of feedback amplifier 44 is fed to the frequency readout apparatus 54 for indication of the frequency of the output signal from such amplifier. In this manner, frequency meter 54 continually affords an indication of the frequency of vibration of wire 24a and hence the stress or tension thereof. Any variation in the stress of wire 24a is immediately reflected as a change in the natural frequency of vibration thereof so that the output of amplifier 44 as indicated or recorded by readout device 54 is changed accordingly.

It will be realized by those persons skilled in the art that wire 24a need not be electrically conductive, but rather it may be formed of any material whatever whereby the vibratory element can be made to vibrate in accordance with its stress, and such vibrations accurately determined. In this regard, it should be noted that by forming vibratory element 24a out of nonmagnetic and nonconductive material and attaching to it magnetically permeable pieces of material, the vibration of such element can be made to vary the reluctance of the air gap of an electromagnetic device. In this manner, the frequency of vibration can be readily and accurately determined. In like manner, the magnetically permeable material which is affixed to the vibratory element can be magnetically attracted by the same or a like electromagnetic device to create a force which will place the vibratory element in vibration. It is thus seen that there exists a wide variety of apparatus for effecting vibration of a prestressed member and for accurately determining the rate of vibration thereof. All of these configurations are contemplated within the scope of this invention, including the concept of employing a fibrous nonconductive string as the vibratory element and coating it with an electrically conductive material for operation as herein described with respect to the apparatus shown in FIGURE 1.

Now, by exposing the underside of diaphragm 16 to condition variations, as for instance pressure variations, as the diaphragm deflects or its displaced, the stress of vibratory element or wire 24a is changed accordingly, the portion 24b of wire 24, at this time, acting as biasing means to insure that diaphragm 16 moves in a straight line in spite of the change in stress or tension of portion 24a. Such change in stress of wire 24a changes the natural frequency of vibration thereof, whereupon the measurement afforded by frequency indicating device 54 is changed accordingly.

It is well known that the relationship between stress change and the change in frequency of vibration of a given wire is not linear, but rather follows a square-law relationship which may be stated in a very general and greatly simplified way, as $f=k\sqrt{t}$, where $f$ is the frequency of vibration of the wire, $k$ is a constant and $t$ is the tension thereof. It is thus seen that if the relationship between diaphragm movement and stress change of vibratable element 24a is linear, the relationship between changes in the condition acting on diaphragm 16 and changes in the frequency of vibration of element 24a is not linear. To overcome this shortcoming, the present invention teaches the positioning of the vibrating element or wire such that the relationship between diaphragm displacement and change in tension of the vibratable element follows a square-law, namely, $t=m^2$, where $t$ is the tension of element 24a and $m$ is the displacement of diaphragm 16. In this manner, the square-law relationship between tension and frequency of the vibrating wire is compensated for by the relationship between diaphragm displacement and the change in tension of wire 24a as will be readily apparent by substituting $m^2$ for $t$ in the equation $f=k\sqrt{t}$. In this manner, the frequency of vibration of the vibratable element is made to vary linearly with variations in the condition acting on diaphragm 16. Also, by positioning the vibratory wire 24a at the angle shown in FIGURE 1 with respect to diaphragm 16, the frequency of vibration of wire 24a is made to increase with increase in the condition acting on the underside of diaphragm 16. Thus, is provided a measurement which varies both directly and linearly with variations in the condition being sensed or measured.

I have found that the most desirable structural arrangement of the present invention is to have the wire 24a initially disposed, i.e. at the lower end of the range of movement of diaphragm 16, at an angle of approximately 6° with respect to the plane of the diaphragm, or, in other words, at an angle of approximately 84° with respect to the line or direction of movement of the rectilinearly movable condition responsive element. In fact, it has been found that optimum linearity is achieved by causing the wire 24a, when in such initial position, to have an initial tension which is equal to the tension which results in a wire of like characteristics and which is neither slack nor under tension of any kind, by moving one end thereof (the other end being stationary) in a plane perpendicular to the original position of the wire until the wire is at an angle of 6° with respect to such initial position. Experimentally, this has been accomplished by originally positioning the wire parallel to the plane of the diaphragm, but such that the wire is neither slack nor under tension. Then by moving the above referred to stationary end of the wire on a line perpendicular to the plane of the diaphragm until the wire is at an angle of 6° with respect to the plane of the diaphragm, such wire is provided with the proper amount of tension to afford optimum linearity between displacement of the diaphragm and change in frequency of vibration of such wire. It will be realized, of course, that any rectilinearly displaceable condition sensing means can be used in place of the diaphragm referred to above without departing from the spirit of the present invention.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:

1. In a vibrating string device for measurement of variations in a given condition, the combination of, a diaphragm having a stationary portion and rectilinearly movable portion having a linear response to said condition, the movable portion of said diaphragm being provided with a projection the axis of which coincides with the line of movement of the said movable portion of said diaphragm, a prestressed vibratable string having a relatively stationary portion and a movable portion fixed to the extremity of said projection, mounting means for the stationary portion of said string disposed in laterally offset position with respect to the axis of said projection and in axially offset position with respect to the extremity thereof to dispose said string at an acute angle with respect to the direction of movement of the movable portion of said diaphragm, and means to vibrate said string at the natural freqhency corresponding to its stress to thereby provide throughout a predetermined range of variations in said condition a measurement which varies linearly with variations in said condition.

2. In the vibrating string device for measurement of variations in a given condition, the combination of, a diaphragm having a stationary peripheral portion and a rectilinearly movable central portion having a linear response to said condition, the central portion of said diaphragm being provided with a projection the axis of which coincides with the line of movement of the said central portion of said diaphragm, a prestressed vibratable string having a relatively stationary portion and a movable portion fixed to the extremity of said projection, mounting means for the stationary portion of said string disposed in laterally offset position with respect to the axis of said projection and in axially offset position with respect to the extremity thereof such as to dispose said string at an angle of approximately 84° with respect to the direction of movement of the central portion of said diaphragm, and means to vibrate said string at the natural frequency corresponding to its stress to thereby provide throughout a predetermined range of variations in said condition a measurement which varies linearly with variations in said condition.

3. In a device for measurement of variations in a given condition, the combination of, a rectilinearly movable condition responsive element exposed to said condition variations and linearly responsive thereto, a prestressed vibratable member having a relatively stationary portion and a portion fixed relative to said condition responsive element, mounting means for the stationary portion of said vibratable member positioned to provide an angle of approximately 84° between the direction of stress of said member and the line of movement of said condition responsive element, and means to vibrate said member at the natural frequency corresponding to its stress, to thereby provide throughout a predetermined range of variations in said condition a measurement which varies linearly with variations in said condition.

4. In a device for measurement of variations in a given condition, the combination of, a rectilinearly movable condition responsive element exposed to said condition variations and linearly responsive thereto, a prestressed vibratable string having a relatively stationary portion and a portion fixed relative to said condition responsive element, mounting means for the stationary portion of said string positioned to dispose the axis thereof at approximately 84° with respect to the line of movement of said condition responsive element, and means to vibrate said string at the natural frequency corresponding to its stress, to thereby provide throughout a predetermined range of variations in said condition a measurement which varies linearly with variations in said condition.

5. In a vibrating string device for measurement of varations in a given condition, the combination of, a diaphragm having a relatively stationary portion and a rectilinearly movable portion exposed to said condition variations and linearly responsive thereto, a prestressed vibratable string having a relatively stationary portion and a portion fixed relative to the movable portion of said diaphragm, mounting means for the stationary portion of said string positioned to provide an angle of approximately 84° between the direction of stress of said string and the line of movement of the movable portion of said diaphragm, and means to vibrate said string at the natural frequency corresponding to its stress, to thereby provide throughout a predetermined range of variations in said condition a measurement which varies linearly with variations in said condition.

6. In a vibrating string device for measurement of variations in a given condition, the combination of, a diaphragm having a relatively stationary portion and a rectilinearly movable portion exposed to said condition variations and linearly responsive thereto; a prestressed vibratable string having a relatively stationary portion and a portion fixed relative to the movable portion of said diaphragm, said string being nonmagnetic and electrically conductive; mounting means for the stationary portion of said string positioned to provide an angle of approximately 84° between the direction of stress of said string and the line of movement of said diaphragm such that the stress of said string is caused to increase with increase in said given condition; means to vibrate said string at the natural frequency corresponding to its stress comprising means for affording magnetic flux flow transversely of said string, a resistance bridge network including said string as one leg thereof, and a feedback amplifier electrically connected to said bridge network whereby said string constitutes a tuned electrical element in an electrical oscillator; to thereby provide throughout a predetermined range of variations in said condition a measurement which varies both directly and linearly with variations in said condition.

7. In a device for measurement of variations in a given condition; the combination of: a rectilinearly movable condition responsive element exposed to said condition variations and linearly responsive thereto; a prestressed vibratable member having a relatively stationary portion and a portion fixed relative to said condition responsive element; mounting means for the stationary portion of said member positioned to dispose the direction of stress of said member at an angle with respect to the line of movement of said condition responsive element such that the relation $t=m^2$, where $t$ is the tension of said member and $m$ is the displacement of said element, prevails throughout a predetermined range of variations in said condition; and means to vibrate said member at the natural frequency corresponding to its stress; to thereby provide throughout said predetermined range of variations in said condition a measurement which varies linearly with variations in said condition.

References Cited in the file of this patent

UNITED STATES PATENTS

| | | |
|---|---|---|
| 2,513,678 | Rieber | July 4, 1950 |
| 2,604,787 | Coyne et al. | July 29, 1952 |
| 2,968,943 | Statham | Jan. 24, 1961 |